United States Patent
Gupta et al.

(10) Patent No.: US 9,245,129 B2
(45) Date of Patent: Jan. 26, 2016

(54) SYSTEM AND METHOD FOR PROTECTING DATA BY RETURNING A PROTECT SIGNAL WITH THE DATA

(71) Applicant: NVIDIA Corporation, Santa Clara, CA (US)

(72) Inventors: Jay Kishora Gupta, Bangalore (IN); Jay S. Huang, Sunnyvale, CA (US); Steven E. Molnar, Chapel Hill, NC (US); Parthasarathy Sriram, Los Altos, CA (US); James Leroy Deming, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 379 days.

(21) Appl. No.: 13/843,838

(22) Filed: Mar. 15, 2013

(65) Prior Publication Data
US 2014/0281319 A1  Sep. 18, 2014

(51) Int. Cl.
*G06F 12/14*  (2006.01)
*G06F 21/60*  (2013.01)
*G06F 21/85*  (2013.01)

(52) U.S. Cl.
CPC ............ *G06F 21/60* (2013.01); *G06F 12/1441* (2013.01); *G06F 12/1458* (2013.01); *G06F 21/85* (2013.01)

(58) Field of Classification Search
CPC ............ G06F 12/1441; G06F 12/1458; G06F 13/1668; G06F 21/60; G06F 21/606; G06F 21/62; G06F 21/6218
See application file for complete search history.

(56) References Cited

U.S. PATENT DOCUMENTS

| | | | | |
|---|---|---|---|---|
| 5,829,041 | A * | 10/1998 | Okamoto et al. | 711/147 |
| 2008/0163382 | A1* | 7/2008 | Blue et al. | 726/28 |
| 2009/0049557 | A1* | 2/2009 | Friedman et al. | 726/27 |
| 2009/0210644 | A1* | 8/2009 | Batifoulier et al. | 711/163 |
| 2010/0007646 | A1* | 1/2010 | Tsuei et al. | 345/212 |
| 2013/0151846 | A1* | 6/2013 | Baumann et al. | 713/156 |
| 2014/0181554 | A1* | 6/2014 | Manne et al. | 713/323 |

FOREIGN PATENT DOCUMENTS

TW  201237666 A  9/2012

OTHER PUBLICATIONS

Office Action from Taiwan Application No. 102144465, dated Jun. 10, 2015.
"ARM Security Technology Building a Secure System using TrustZone Technology," 2005, pp. 1-4, retrieved from http://infocenter.arm.com/help/topic/com.arm.doc.prd29-genc-009492c/index.html.

(Continued)

Primary Examiner — Hal Schnee
(74) Attorney, Agent, or Firm — Zilka-Kotab, PC

(57) ABSTRACT

A system and method are provided for protecting data. In operation, a request to read data from memory is received. Additionally, it is determined whether the data is stored in a predetermined portion of the memory. If it is determined that the data is stored in the predetermined portion of the memory, the data and a protect signal are returned for use in protecting the data. In certain embodiments of the invention, data stored in the predetermined portion of the memory may be further processed and written back to the predetermined portion of the memory. In other embodiments of the invention, such processing may involve unprotected data stored outside the predetermined portion of the memory.

21 Claims, 7 Drawing Sheets

(56) References Cited

OTHER PUBLICATIONS

Azema, J. et. al. "M-Shield Mobile Security Technology: making wireless secure," 2008, pp. 1-6, retrieved from http://focus.ti.com/pdfs/wtbu/ti_mshield_whitepaper.pdf.

"HD movies on your PC with Intel Insider," Feb. 2013, pp. 1-4, retrieved from https://web.archive.org/web/20130227233836/http://www.intel.com/content/www/us/en/architecture-and-technology/intel-insider-for-premium-hd-home-entertainment.html.

Knupffer, N., "Intel Insider—What is It?" 2011, pp. 1-38, retrieved from http://blogs.intel.com/technology/2011/01/intel_insider_-_what_is_it_no/.

"Sitara ARM Processors & DSP Processors from TI.com," 2015, p. 1, retrieved from http://www.ti.com/general/docs/wtbu/wtbugencontent.tsp?templateId=6123&navigationId=12316&contentId=4629&DCMP=WTBU&HQS=Other+EM+m-shield.

"Sandy Bridge," Wikipedia, Mar. 2013, pp. 1-15, retrieved from https://web.archive.org/web/20130308040936/http://en.wikipedia.org/wiki/Sandy_Bridge.

* cited by examiner

SYSTEM AND METHOD FOR PROTECTING DATA BY RETURNING A PROTECT SIGNAL WITH THE DATA

FIELD OF THE INVENTION

The present invention relates to data protection, and more particularly to protected memory regions.

BACKGROUND

Computer systems are frequently used to view or display media and other data that must be protected from copying and other unauthorized access. Traditionally, computer systems have secured protected data through encryption. However, to view or display the data, it must be decrypted and may need additional processing. Decrypted data is vulnerable to copying and other unauthorized access by system devices or software. Certain prior art systems restrict access to a designated portion of memory to secure clients (e.g. the display). However, advanced algorithms for decoding, compositing, or other processing of protected data require access by multiple devices, some of which may be programmable or have the ability to copy the data. It is desirable that user applications, operating system providers, and third-party software providers be able to configure the video and compositing pipelines in a variety of ways. However, it is impractical to use secure software to implement the variety of algorithms and complex interactions with operating system software that may be desired. Because content providers do not have control over what this software does, and such software is subject to attacked or corruption, it cannot be given unrestricted access to the protected data. Accordingly, what is needed is a hardware barrier that prevents protected content from escaping the system, while leaving software the flexibility to manipulate and display the protected content.

SUMMARY

A system and method are provided for protecting data. In operation, a request to read data from memory is received. Additionally, it is determined whether the data is stored in a predetermined portion of the memory. If it is determined that the data is stored in the predetermined portion of the memory, the data and a protect signal are returned for use in protecting the data. In certain embodiments of the invention, data stored in the predetermined portion of the memory may be further processed and written back to the predetermined portion of the memory. In other embodiments of the invention, such processing may involve unprotected data stored outside the predetermined portion of the memory.

DETAILED DESCRIPTION

Figure 1:
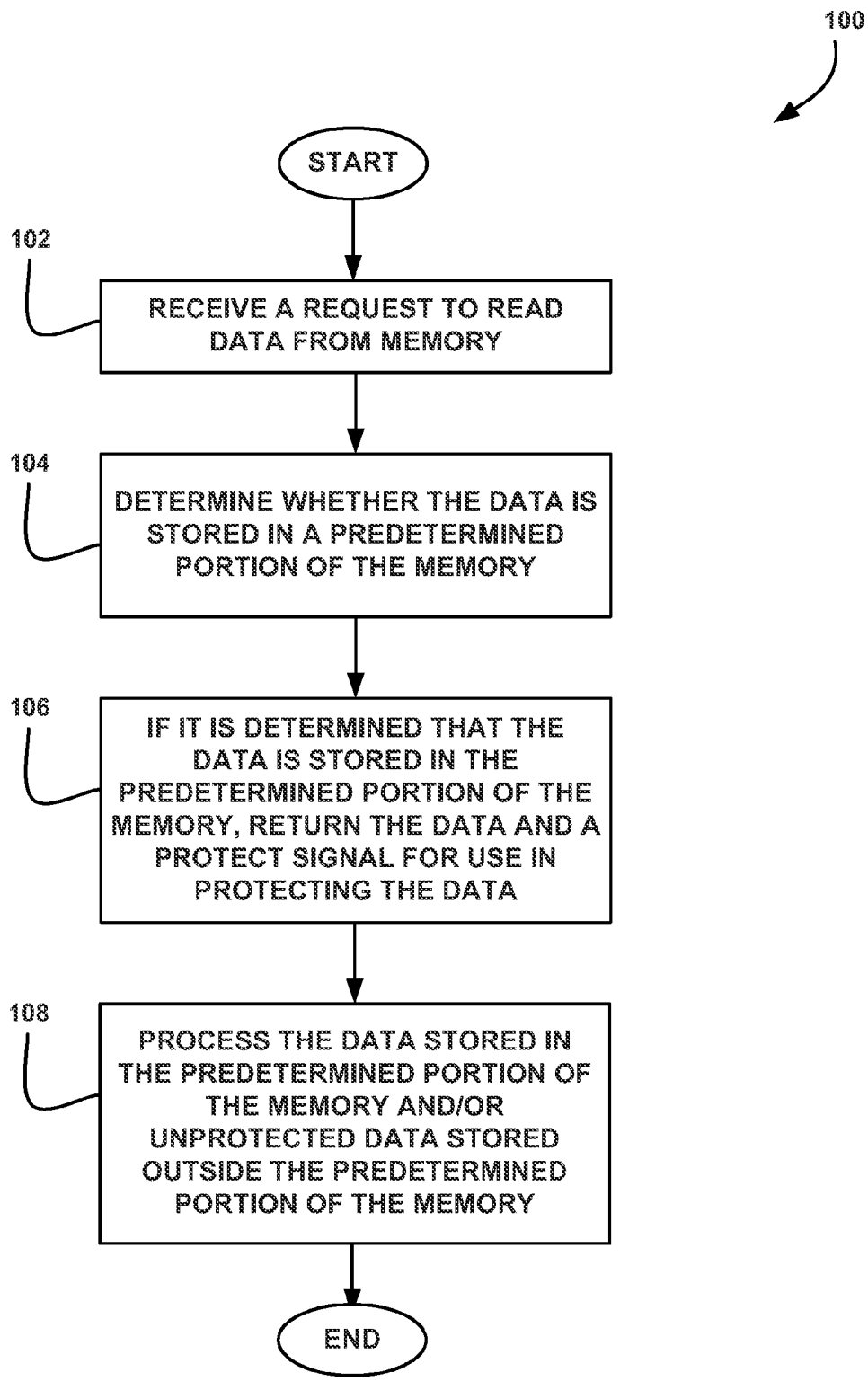
FIG. 1 shows a method for protecting data, in accordance with one embodiment.

FIG. 1 shows a method 100 for protecting data, in accordance with one embodiment. As shown, a request to read data from memory is received. See operation 102. Additionally, it is determined whether the data is stored in a predetermined portion of the memory. See operation 104. If it is determined that the data is stored in the predetermined portion of the memory, the data and a protect signal are returned for use in protecting the data. See operation 106.

The memory may include any type of memory. For example, in various embodiments, the memory may include, but is not limited to, one or more of flash memory (e.g. NOR flash memory, NAND flash memory, etc.), random access memory (e.g. RAM, SRAM, DRAM, SDRAM, eDRAM, embedded DRAM, MRAM, ST-MRAM, STT-MRAM, PRAM, PCRAM, etc.), phase-change memory, FeRAM, FRAM, PRAM, MRAM, a solid-state disk (SSD), and/or any other type of memory.

Additionally, in one embodiment, the memory may include a dynamic random access memory (DRAM) circuit. In various embodiments, such DRAM may take any form including, but not limited to, synchronous DRAM (SDRAM), double data rate synchronous DRAM (DDR SDRAM, DDR2 SDRAM, DDR3 SDRAM, DDR4 SDRAM, etc.), graphics double data rate DRAM (GDDR, GDDR2, GDDR3, etc.), quad data rate DRAM (QDR DRAM), fast page mode DRAM (FPM DRAM), video DRAM (VDRAM), extended data out DRAM (EDO DRAM), burst EDO RAM (BEDO DRAM), multibank DRAM (MDRAM), synchronous graphics RAM (SGRAM), low-power DRAM (LPDRAM), combinations of these and/or any other type of memory.

Furthermore, the predetermined portion of the memory may include any contiguous or non-contiguous portion or portions of memory. In one embodiment, the location and/or size of the predetermined portion of the memory may be determined during a system boot process. In another embodiment, the location and/or size of the predetermined portion of the memory may be determined after a system boot process.

Additionally, in one embodiment, the size of the predetermined portion of the memory may be fixed throughout a particular system cycle (e.g. between system power-ups, between a specific application instance, etc.). In another embodiment, a size of the predetermined portion of the memory may be dynamically adjusted (e.g. in response to memory requirements, etc.).

Further, in one embodiment, it may be determined whether the data is stored in at least one of a plurality of predetermined portions of the memory. In this case, if it is determined that the data is stored in at least one of the plurality of predetermined portions of the memory, the data, the protect signal, and an identifier may be returned, where the identifier is associated with at least one of the plurality of the predetermined portions of the memory. In one embodiment, the plurality of predetermined portions of the memory may each be configured to be accessed by specific hardware engines.

In one embodiment, the protect signal may be implemented in hardware. For example, in one embodiment, the protect signal may be implemented in hardware associated with a memory controller. In another embodiment, the protect signal may be implemented in a memory management unit.

The data may include any type of data capable of being stored in memory. For example, in one embodiment, the data may include pixel data. In another embodiment, the data may include decoded pixel data. In another embodiment, the data may include video data (e.g. decoded video data, etc.). In another embodiment, the data may include data associated with pixel data and/or video data (e.g. data derived from pixel data and/or video data, etc.). Still yet, in one embodiment, the data may include at least one key capable of being utilized to encrypt and/or decrypt other data.

Further, in one embodiment, the request to read data from the memory may be received by a memory controller. In another embodiment, the request to read data from the memory may be received by a memory management unit. Of course, in various embodiments, the memory controller, a memory management unit, and/or any other unit may be capable of enforcing the protection of the data. Additionally, in one embodiment, the request may be received from a client with an associated status. For example, in one embodiment, the associated status of the client may include at least one of trusted status, an untrusted status, or a conditionally trusted status. In one embodiment, the memory controller may receive a write request from a client and, based on the associated status of the client, the write may be accepted or rejected.

In one embodiment, the data may be conditionally returned to the client based on the associated status. For example, if the associated status of the client includes a trusted status, the data within the protected memory portion may be returned to the client. As another example, if the associated status of the client includes an untrusted status, the data may not be returned to the client, or irrelevant data may be returned to the client (e.g. all zeros, garbage data, etc.). As yet another example, if the associated status of the client includes a conditionally trusted status, the data within the protected memory portion may be returned to the client, but subsequent writes may only be performed if certain conditions are met (e.g. predetermined conditions, etc.).

Further, in one embodiment, the associated status of a conditionally trusted client may be changed as a function of the protect signal associated with data being read. If a conditionally trusted client reads from a protected region, it becomes poisoned (e.g. it sets an internal flag indicating it has read and/or is operating with protected data). If it is poisoned, it can only write to the protected region. If the conditionally trusted client is cleared of the protected data (i.e. it is unpoisoned, etc.), it can write data anywhere.

In another embodiment, the associated status of the client may be changed programmatically. For example, the associated status of the client may be programmatically classified into a trusted status, an untrusted status, and/or a conditionally trusted status.

In one embodiment, the client may include a graphics processor which includes a plurality of sub-clients, each including a sub-status. Additionally, in one embodiment, the associated status of the graphics processor may be based on the sub-status of at least one of the sub-clients. For example, if an engine associated with the graphics processor has a poisoned status, the graphics processor may have a poisoned status.

Further, in one embodiment, a memory management unit (MMU) of the graphics processor may manage read requests and write requests from the sub-clients. For example, in one embodiment, an MMU associated with the graphics processor may determine whether the sub-clients are permitted to access the data stored in the predetermined portion of memory.

In one embodiment, information describing the location and size of the predetermined portion of memory may be communicated to a plurality of memory management sub-units via at least one secure link. In one embodiment, all memory management sub-units may possess the same region description information, such that the memory management sub-units are all able to police memory accesses that they service.

As shown further, in one embodiment, the method 100 of FIG. 1 may include further processing of the data stored in the predetermined portion of the memory. In one embodiment, such processing may involve unprotected data stored outside the predetermined portion of the memory. See operation 108. For example, in one embodiment, a video compositing pipeline may composite secure and non-secure content, while keeping composited content secure. In another embodiment, an entire rendering context may be stored in the predetermined portion of the memory. In this case, the data may include the rendering context data.

Protecting the data may include various types of protection. In one embodiment, protecting the data may include allowing the data to be written or copied only to the predetermined portion of the memory. In another embodiment, protecting the data may include allowing information associated with the data (e.g. information derived from the data, information calculated from the data, a transformation of the data, etc.) to be written or copied only to the predetermined portion of the memory.

Further, in one embodiment, a request to operate on the data may be received, and the data may be determined to be protected. In this case, in one embodiment, the operation on the data may be conditionally performed, based on the determination whether the data is protected. For example, a request to operate on protected data may be allowed if it is determined that the client sending the request is a trusted client.

Further, in one embodiment, data may be read from memory with an associated protection status. The protection status may be managed utilizing one of protected status flags tagging the data or a persistent poison flag in a client. Further, subsequent writes may be policed to ensure writes that potentially contain protected data are only written to a protected region of the memory.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
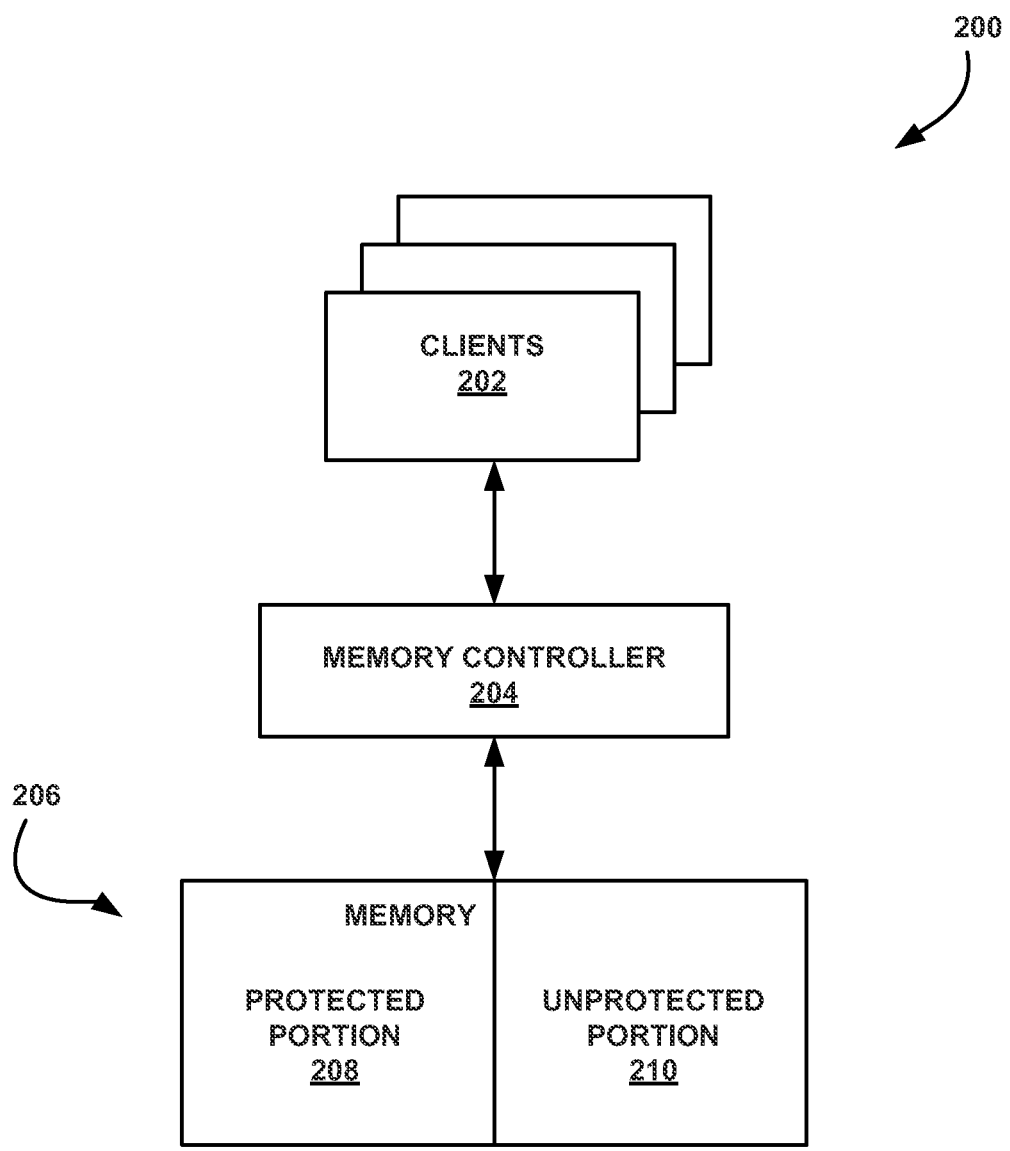
FIG. 2 shows a system for protecting data, in accordance with one embodiment.

FIG. 2 shows a system 200 for protecting data, in accordance with one embodiment. As an option, the system 200 may be implemented in the context of the proceeding Figure and/or any subsequent Figure(s). Of course, however, the system 200 may be implemented in any desired environment. It should also be noted that the aforementioned definitions may apply during the present description.

As shown, one or more clients 202 are in communication with a memory controller 204. Additionally, the memory controller 204 is in communication with at least one memory 206. Although the memory 206 is illustrated as one memory device, in various embodiments, the memory 206 may represent a plurality of memory devices. Furthermore, in various embodiments, the memory 206 may include one or more of flash memory (e.g. NOR flash memory, NAND flash memory, etc.), random access memory (e.g. RAM, SRAM, DRAM, SDRAM, eDRAM, embedded DRAM, MRAM, ST-MRAM, STT-MRAM, PRAM, PCRAM, etc.), phase-change memory, FeRAM, FRAM, PRAM, MRAM, a solid-state disk, and/or any other type of memory.

Additionally, in one embodiment, the memory 206 may include dynamic random access memory. In various embodiments, such DRAM may take any form including, but not limited to, synchronous DRAM, double data rate synchronous DRAM (DDR SDRAM, DDR2 SDRAM, DDR3 SDRAM, DDR4 SDRAM, etc.), graphics double data rate DRAM (GDDR, GDDR2, GDDR3, etc.), quad data rate DRAM, fast page mode DRAM, video DRAM, extended data out DRAM, burst EDO RAM, multibank DRAM, synchronous graphics RAM, low-power DRAM, and/or any other similar memory technology.

The clients 202 may include any type of client hardware capable of communicating (directly or indirectly) with a memory controller (or components associated therewith) including, but not limited to, encoders (e.g. video encoders, etc.), decoders (e.g. a video decoder, etc.), one or more displays, video compression engines, security engines, CPUs, GPUs, other processors, and/or any other client hardware capable of communicating (directly or indirectly) with a memory controller (or components associated therewith).

As shown further, the memory 206 includes a protected portion of memory 208 and an unprotected portion of memory 210. In operation, the memory controller 204 may receive a read request from one or more of the clients 202 to read data from the memory 206. In turn, the memory controller 204 may determine whether the data is stored in the protected portion of the memory 208. If the memory controller 204 determines that the data is stored in the protected portion of the memory 208, the data and a protect signal may be returned to the client 202 from which the request originated. If the memory controller 204 determines that the data is not stored in the protected portion of the memory 208 (e.g. the data is stored in the unprotected portion 210, etc.), the requested data may be returned to the client 202 from which the request originated.

In one embodiment if the client is an untrusted client and the data is in the protected portion of memory, the data may be scrubbed. Further, in one embodiment, once the client 202 receives the data and the protect signal, the client 202 may identify that particular data as protected data. In one embodiment, the client 202 may identify that particular data as protected data utilizing a signal. In another embodiment, the client 202 may identify that particular data as protected data utilizing a flag. In another embodiment, the client 202 may mark the data and/or any data associated therewith as protected data (e.g. utilizing a signal, utilizing a flag, etc.). In one embodiment, when the client 202 receives protected data, the client may be "poisoned" such that the client is set to a persistent state of protection as a result of receiving the protected data. Further, in one embodiment, the protected status of the data may be conveyed through the system and reflected on a protected signal from the client 202.

In one embodiment, the client 202 may only have permission to write the protected data (or data associated therewith, etc.) to the protected portion of memory 208. For example, in one embodiment, the data identified as protected data may be flagged (or otherwise identified, etc.) as protected data such that when the client 202 attempts to write the data, the memory controller 204 only allows a write to occur in the protected portion of memory 208.

In this way, data stored in the protected portion of memory 208 may remain protected during system operation. As an exemplary implementation, a region (e.g. the protected portion 208, etc.) of the memory 206 may be selected (e.g. on system boot, dynamically during system operation, etc.) and dedicated for storing the pixels in the video processing pipeline. In this case, only hardware engines (e.g. particular clients, etc.) that are required to access the data in this pipeline may have access to this protected memory region. In this case, the memory controller 204 may reject access from other hardware engines trying to access this memory (e.g. the protected portion 208, etc.).

In one embodiment, in order to prevent copying of the protected data (e.g. reading from the protected memory portion and writing to an unprotected memory portion, etc.), the memory controller 204 may send a protect signal (e.g. a poison flag, a protected data flag, etc.) along with the read response, when a hardware engine accesses the protected portion of memory 208. In one embodiment, the hardware engine (e.g. one or more of the clients 202, etc.) may note the protect signal (e.g. by keeping the flag, etc.) and may send the protect signal back to the memory controller 204 when the hardware engine (e.g. one or more of the clients 202, etc.) generates any data that is derived from processing the protected data. In this case, when the memory controller 204 detects the protect signal associated with any write request, the memory controller 204 may reject the request if the request is targeting a region outside of the protected memory portion.

Figure 3:
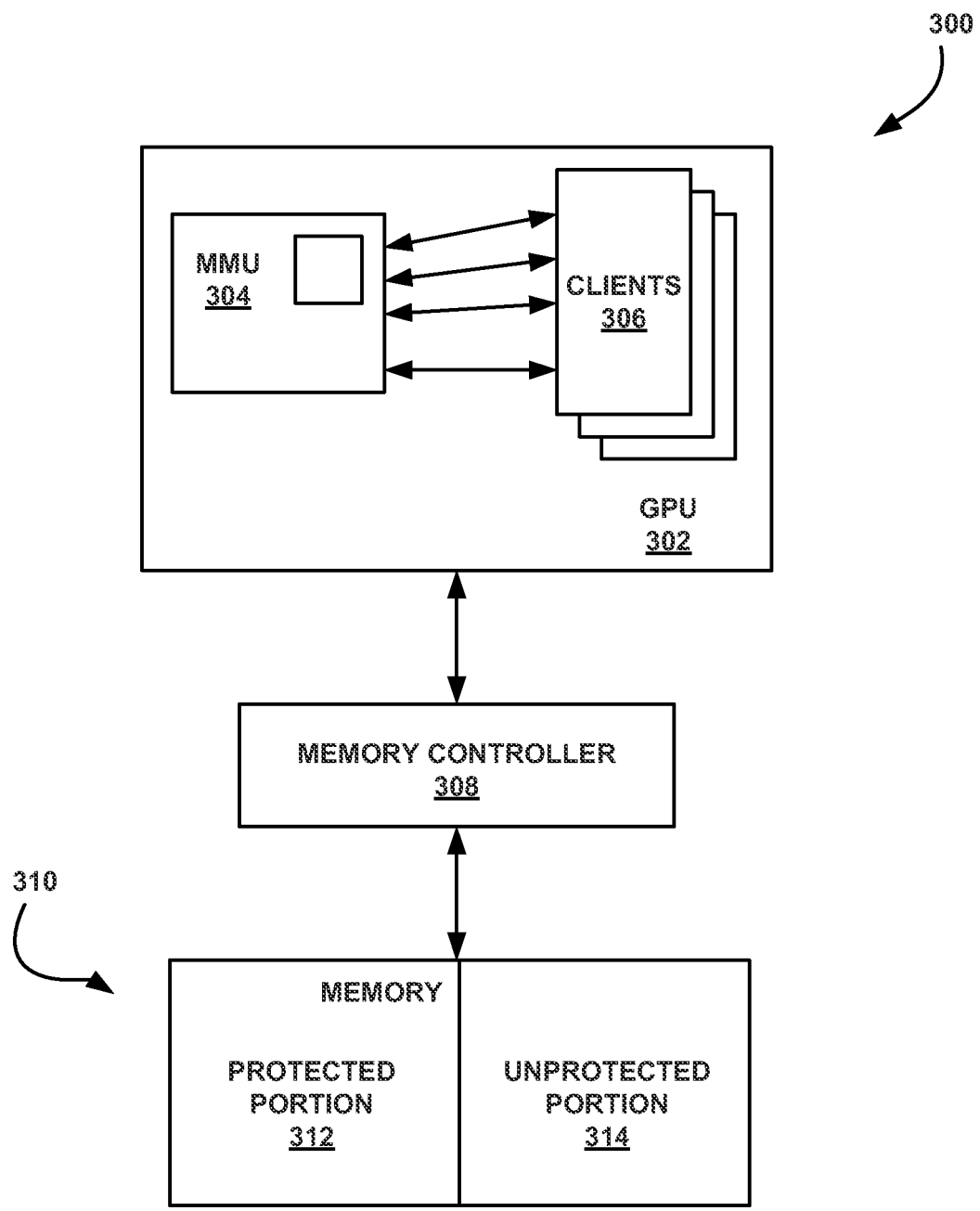
FIG. 3 shows a system for protecting data, in accordance with one embodiment.

FIG. 3 shows a system 300 for protecting data, in accordance with one embodiment. As an option, the system 300 may be implemented in the context of the proceeding Figures and/or any subsequent Figure(s). Of course, however, the system 300 may be implemented in any desired environment. It should also be noted that the aforementioned definitions may apply during the present description.

As shown, a graphics processing unit (GPU) 302 may include one or more memory management units 304, and one or more clients 306. The GPU may be in communication with a memory controller 308. Additionally, the memory controller 308 is in communication with at least one memory 310. Although the memory 310 is illustrated as one memory device, in various embodiments, the memory 310 may represent a plurality of memory devices. Furthermore, in various embodiments, the memory 310 may include one or more of flash memory (e.g. NOR flash memory, NAND flash memory, etc.), random access memory (e.g. RAM, SRAM, DRAM, SDRAM, eDRAM, embedded DRAM, MRAM, ST-MRAM, STT-MRAM, PRAM, PCRAM, etc.), phase-change memory, FeRAM, FRAM, PRAM, MRAM, a solid-state disk, and/or any other type of memory.

Additionally, in one embodiment, the memory 310 may include dynamic random access memory. In various embodiments, such DRAM may take any form including, but not limited to, synchronous DRAM, double data rate synchronous DRAM (DDR SDRAM, DDR2 SDRAM, DDR3 SDRAM, DDR4 SDRAM, etc.), graphics double data rate DRAM (GDDR, GDDR2, GDDR3, etc.), quad data rate DRAM, fast page mode DRAM, video DRAM, extended data out DRAM, burst EDO RAM, multibank DRAM, synchronous graphics RAM, low-power DRAM, and/or any other similar memory technology.

The clients 306 may include any type of client hardware capable of communicating (directly or indirectly) with the MMU 304 (or components associated therewith) including, but not limited to, encoders (e.g. video encoders, etc.), decoders (e.g. a video decoder, etc.), one or more displays, video compression engines, security engines, graphics processors, other processors, and/or any other client hardware capable of communicating (directly or indirectly) with the MMU 304 (or components associated therewith).

As shown further, the memory 310 includes a protected portion of memory 312 and an unprotected portion of memory 314. In operation, the memory controller 308 may receive a request from one or more of the clients 306, the MMU 304, or the GPU 302 to read data from the memory 310. The memory controller 308 may determine whether the data is stored in the protected portion of memory 312. If the memory controller 308 determines that the data is stored in the protected portion of the memory 312, the data and a protect signal may be returned to the CPU 302, the MMU 304, and/or one or more of the clients 306. If the memory controller 308 determines that the data is not stored in the protected portion of memory 312 (e.g. the data is stored in the unprotected portion 314, etc.), the requested data may be returned to the GPU 302, the MMU 304, and/or one or more of the clients 306. Of course, in one embodiment, the MMU 304 may be configured to enforce the protection of data in the protected portion of memory 312.

For example, in one embodiment, the MMU 304 may function as a gatekeeper for the memory controller and may implement the protection protocol. Accordingly, in one embodiment, the MMU 304 may be an alternative mechanism for policing accesses of protected content (in addition to the memory controller). For example, in one embodiment, for read accesses, the MMU 304 may identify whether a particular read accesses the protected region and may provide the protected flag bit. Additionally, in one embodiment, the MMU 304 may flag read requests as invalid based on the client type and indicate the data should be scrubbed. In various embodiments, the scrubbing may be performed by the memory controller 308, by the client 306, or by the MMU 304 (e.g. if the read return data flows through the MMU, etc.). For writes, in one embodiment, the MMU 304 may identify whether a write request is accessing a protected region, and based on the client flag, can kill the write. From the point of view of the memory controller, write requests that have been policed by the MMU are known to be legitimate.

In one embodiment, the protected portion of memory 312 may be defined prior to a system boot. In another embodiment, the protected portion of memory 312 may be defined after a power-up of the system 300. In another embodiment, the protected portion of memory 312 may be defined during a boot process. In another embodiment, the protected portion of memory 312 may be defined dynamically. Additionally, in one embodiment, the protected portion of memory 312 may be defined by registers in the memory controller 308. In this case, once a corresponding lock register is set, all write accesses to protected memory related configuration registers may be dropped.

Table 1 shows exemplary signals that may be viewed in the context of this example, and/or other embodiments. For the purposes of this particular example, the protected memory portion is referred to a video protection region (VPR).

TABLE 1

| Signal | Description |
|---|---|
| rdclient2mc_rd_vpr | This signal indicates if the read client is allowed access to the VPR. <br> 1'b1: Read accesses to VPR should be allowed <br> 1'b0: Read accesses to VPR should not be allowed |
| mc2rdclient_resp_vpr | This signal indicates that this response data was sourced from VPR aperture. <br> 1'b1: Response data is sourced from VPR aperture <br> 1'b0: Response data is not sourced from VPR aperture |
| wrclient2mc_wr_vpr | This signal indicates whether writes should be allowed outside the VPR aperture or not. |

TABLE 1-continued

| Signal | Description |
|---|---|
| | 1'b1: Write should not be allowed outside the VPR aperture <br> 1'b0: Writes should be allowed anywhere in the memory. |

The various signals may be used differently by different clients, according to their role in the system. In addition, some clients may contain sub-clients with different access requirements. For example, in one exemplary embodiment, a video decoder (VDE), may have several sub-clients that need access to the VPR (e.g. VDE.MCE, VDE.TPM, VDE.TPE, etc.), but an additional sub-client (e.g. VDE.BSEV), which only needs to access an encrypted bit-stream located in unprotected memory space.

Table 2 shows exemplary code for setting a VDE protected state, in accordance with one embodiment.

TABLE 2

```
assign vde2mc_rd_vpr = TrustZone_secure_flag_set &&
( (src_client == MCE) || (src_client == TPE));
assign vde2mc_wr_vpr = TrustZone_secure_flag_set &&
(src_client == TPM);
```

As another example, the client may include a video image composition engine (VIC), also referred to as a VS or 2D engine. In operation, the VIC may need access to the VPR for performing compositing, while the system is playing back protected content. In this case, in one embodiment, data read from a protected memory region may be prohibited from being written back to unprotected memory.

In one embodiment, the VIC may normally be allowed access to read from a protected memory region. Of course, if the request is tagged as sourced from a specific unauthorized client, read access to the protected memory portion may be denied.

In the case that a read request does indeed access the protected memory portion, in one embodiment, the response may be flagged back to the VIC client (e.g. returned by the memory controller, returned by the MMU, etc.). After the VIC processes the data (e.g. with at least one memory data response flagged as protected data, etc.), in one embodiment, the VIC may tag processed write data to the memory controller. As an option, at the end of a frame, the VIC engine may be reset, which may also cause a reset of the internal flag. In one embodiment, the VIC engine may have a persistent state bit that is set when a response is received with the flag set.

In one embodiment, the memory controller may permit write access to only the protected portion of memory if the write request is tagged (e.g. with the protect signal, etc.). In one embodiment, any tagged write access from the VIC may not be allowed to proceed to any region outside the protected memory portion. In this case, in one embodiment, any such write requests may be dropped, an error may be logged, and an interrupt may be raised (e.g. if configured, etc.).

Table 3 shows exemplary code for setting a VIC protected state, in accordance with one embodiment.

TABLE 3

```
assign vic2mc_rd_vpr = (src_client != vic_falcon);
::flop vic_vpr_flag <0= mc2vic_resp_vpr ?
1'b1 : frame_done ? 1'b0 : vic_vpr_flag;
assign vic2mc_wr_vpr = (VIC_writing_pixel_data) && vic_vpr_flag;
```

As another example, the client may include a display. In this case, in one embodiment, the display may only perform read accesses and may always be allowed access to the protected portion of memory.

Table 4 shows exemplary code for setting a display protected state, in accordance with one embodiment.

TABLE 4 assign disp2mc_rd_vpr = 1'b1;

As another example, the client may include a GPU. In this case, the GPU may need access to the protected memory portion when performing compositing of protected content into a full-screen display buffer, when using 2D or 3D pipelines, and/or performing computations for video processing. In one embodiment, legitimate read access may be permitted from texture, shared memory (SM) (e.g. via L1, etc.), or a render output unit (ROP). Additionally, in one embodiment, legitimate write access may be allowed from shared memory (via L1) or ROP.

In some cases, the GPU may have many clients in addition to standard 3D clients, some of which may need to access to unprotected memory while the pipeline is operating on protected data. For example, reports or notifiers may be written to unprotected memory while performing a composite to protected memory. In some cases, certain GPU clients may not be allowed to access protected memory. For example, in various embodiments, such clients may include, host clients (e.g. BAR1 accesses from the CPU, push buffers, instance buffers, etc.), front-end (FE) clients (e.g. semaphores, reports, notifiers, inline_to_memory writes, etc.), and a GMMU fill unit, (e.g. GMMU page-tables must be writable by the CPU so may be in unprotected memory, etc.). In another embodiment, CPU clients that include conditional access units may include other host accesses, FE clients (e.g. vertex buffers, etc.), certain SM clients, stream in/stream out clients, ZCull, and WID, etc.

For implementation in the GPU, in one embodiment, a graphics memory management unit (GMMU) may have a copy of video protection region registers of a system memory management unit (SMMU), which may be conveyed over a serial interface each time the GPU is reset. In another embodiment, the memory controller may include the video protection registers and the SMMU may not be involved. In one embodiment, the G MMU may test each memory access against the region registers. Further, in one embodiment, this may be accomplished by first converting from virtual addresses to physical addresses.

In one embodiment, if an unprotected client attempts to read protected memory, the GMMU may fault. Furthermore, in one embodiment, the GMMU may have a 'protected_mode' state bit that is set when a read of texture (e.g. or an L1 read, etc.) or some other surface is to protected memory. In one embodiment, the protected mode bit may require all subsequent writes from L1, ROP, etc., to be to protected memory. For example, in one embodiment, writes from any of these clients may fault if they are not to physical addresses in protected memory.

In one embodiment, the protected mode bit may be cleared when the GPU is context switched. In some cases, this may be indicated by an existing signal that indicates all context-switched data has been saved and may cause any state that should not be preserved across a context switch to be discarded. Additionally, in one embodiment, the protected mode bit need not be restored after a context switch, since a pipeline state that is saved and restored after the context switch may be guaranteed not to retain protected data.

Further, in one embodiment, the memory controller may regard all writes from the GPU (e.g. via the L2, etc.) as safe, regardless if the writes are to protected or unprotected memory. For example, in one embodiment, the memory controller may assume the GPU implements its own policing (e.g. utilizing an MMU, etc.).

As another exemplary implementation, all GPU accesses may be communicated to the memory via L2 memory cache, such that the L2 cache is integral to GPU support of maintaining the protected data. For example, in one embodiment, a 'protected' state bit may be provided for each cache line. In the case of read data, the protected bit may be set if the memory is read from the protected portion of memory (e.g. mc2ltc_resp_vpr=='1', etc.). In one embodiment, the protected bit may be returned to the client on a new signal (e.g. an ltc2client_resp_vpr signal in the case of LTC returns, etc.).

In the case of write data, the protected bit may be set if any client write to the cache line has a protect signal indicator (e.g. client2ltc_wr_vpr=='1', whether the initial write or any subsequent write, etc.). In the case of volatile writes, ltc2mc_wr_vpr may be set to client2tc_wr_vpr of the write request. In another embodiment, reads by unsecure clients to protected cache lines may be scrubbed to 0xffff (e.g. and an error may be logged, etc.). Further, in one embodiment, the protected bit may be forwarded to the memory controller (e.g. on ltc2mc_wr_vpr, etc.) during cache line cleans. In one embodiment, the memory controller may discard the write and log an error if ltc2mc_wr_vpr=='1' and the write is outside the protected region.

Table 5 shows exemplary code, in accordance with one embodiment.

TABLE 5 assign gpu2mc_rd_vpr = (src_slient == TEX || src_client == SM || src_client == ROP);
::flop gpu_vpr_flag <0= mc2gpu_resp_vpr ? 1'b1 : context_done ? 1'b0 : gpu_vpr_flag;
assign gpu2mc_wr_vpr = gpu_vpr_flag;

Further, in another embodiment, the client may include a security engine (SEC engine). In one embodiment, the security engine may be permitted full read and write access to the protected memory portion.

Table 6 shows exemplary code for setting an SEC engine protected state, in accordance with one embodiment.

TABLE 6 assign sec2mc_rd_vpr = 1'b1;
assign sec2mc_wr_vpr = 1'b0;

In another embodiment, the client may include a multi-core processor (MPCORE). In one embodiment, the MPCORE may require access to the protected memory portion for system verification. In one embodiment, a secure flag may be set in the memory controller only under controlled diagnostic conditions to allow the protected memory portion access from the MPCORE, with no protection against copying data to unprotected memory regions.

Table 7 shows exemplary code for setting an HDA engine protected state, in accordance with one embodiment.

TABLE 7 assign mpcore2mc_rd_vpr = mc_diagnostic_flag;
assign mpcore2mc_wr_vpr = 1b'0;

Table 8 shows access permissions, in accordance with one embodiment.

TABLE 8

| Operation | vpr attribute value of the request | Does req address fall in the VPR range? (X-don't care) | Status |
|---|---|---|---|
| Read | 0 | 0 | Ok |
| Read | 1 | X | Ok |
| Read | 0 | 1 | ERR |
| Write | 0 | X | Ok |
| Write | 1 | 1 | Ok |
| Write | 1 | 0 | ERR |

Table 9 shows exemplary protect memory portion related signals for various clients, in accordance with one embodiment.

TABLE 9

| Client | Type | *rd_vpr | *wr_vpr |
|---|---|---|---|
| VDE | Conditionally Trusted | Dynamic: Driven by client | Dynamic: driven by client. |
| VIC | Conditionally Trusted | Static: 1'b1 | Dynamic: driven by client. |
| MSENC | Conditionally Trusted | Dynamic: driven by client | Dynamic: driven by client. |
| Display | Trusted | Static: 1'b1 | N/A |
| GPU | Conditionally Trusted | Dynamic: driven by client | Dynamic: driven by client |
| HDA | Trusted | Static: 1'b1 | static: 1'b0 |
| SEC | Trusted | Static: 1'b1 | Static: 1'b0 |
| MPCORE | Untrusted | Static: driven by flag | Static: 1'b0 |
| Others | Untrusted | Static: 1'b0 | Static: 1'b0 |

Figure 4:
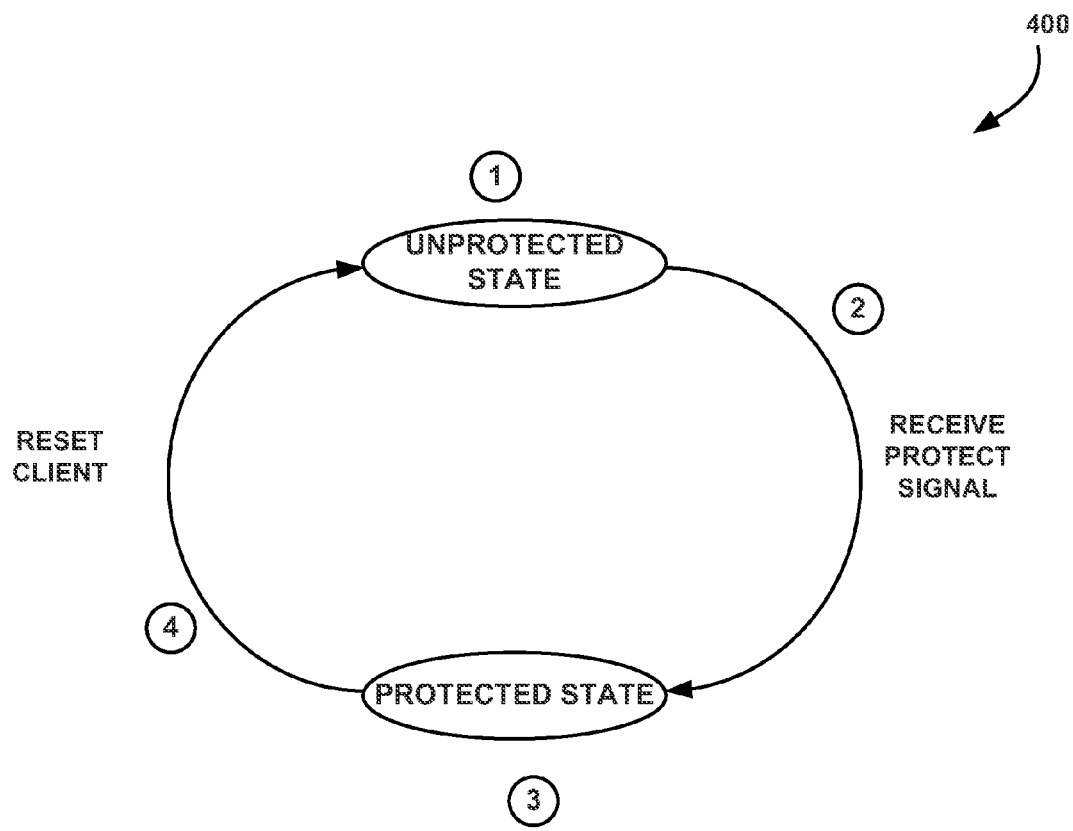
FIG. 4 shows a flow diagram illustrating client hardware entering a protected data state, in accordance with one embodiment.

FIG. 4 shows a flow diagram 400 illustrating client hardware entering a protected data state, in accordance with one embodiment. As an option, the flow diagram 400 may be implemented in the context of the proceeding Figures and/or any subsequent Figure(s). Of course, however, the flow diagram 400 may be implemented in any desired environment. It should also be noted that the aforementioned definitions may apply during the present description.

As shown, in one embodiment, a client may initialize in an unprotected state. See step 1. Once the client receives a protect signal (e.g. from a memory controller, etc.), the client may enter a protected state. See steps 2-3. In one embodiment, the client may receive the protect signal in response to sending a read request to a memory controller. Additionally, in one embodiment, data may be received along with the protect signal.

For example, a client may send a read request to a memory controller. The memory controller may determine that the data associated with the request is protected data (or the data is stored in a protected memory portion, etc.). If the memory controller determines that the data associated with the request is protected data (or the data is stored in a protected memory portion, etc.), the memory controller may determine whether the client is permitted to access the protected data. If it is determined that the client is permitted to access the protected data, the protected data is returned to the client, along with the protect signal. In response to receiving the protect signal, in one embodiment, the client may enter the protected state. In one embodiment, any subsequent write associated with the protected data performed by the client may be accompanied by the protect signal, or another signal indicating the data is protected data and/or derived from protected data.

As shown further in FIG. 4, in one embodiment, the client may be reset such that the client enters the unprotected state from the protected state. See step 4. In one embodiment, the client may be reset on system power down. In another embodiment, the client may be reset on system boot. In another embodiment, the client may be reset by the memory controller. In another embodiment, the client may receive a reset signal. In another embodiment, the client may be reset by a context switch. Once the client is reset, in one embodiment, subsequent writes by the client may not include a protect signal indicator (e.g. until the client again accesses protected data, etc.).

Figure 5:
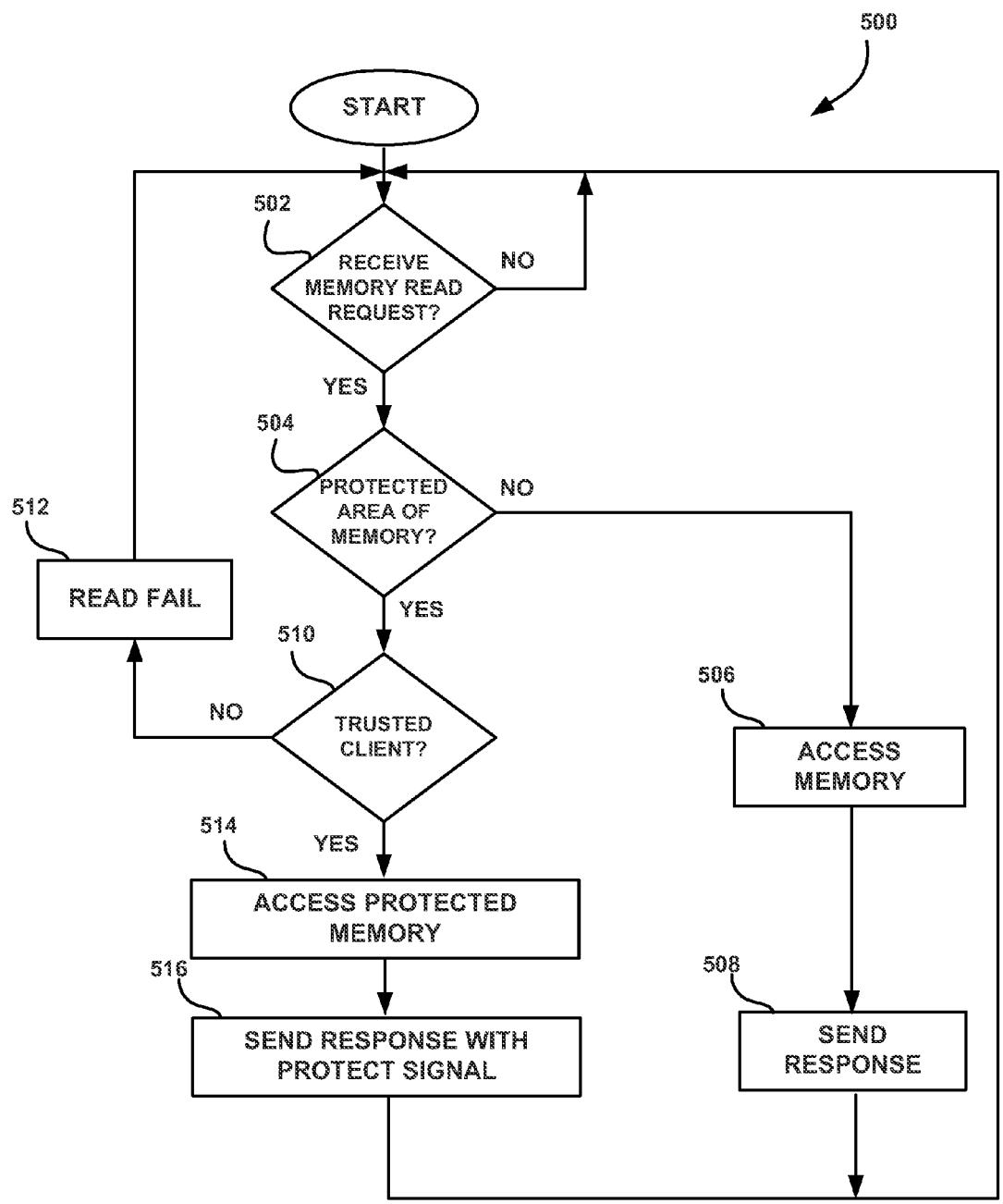
FIG. 5 shows a memory controller method for protecting data, in accordance with one embodiment.

FIG. 5 shows a memory controller method 500 for protecting data, in accordance with one embodiment. As an option, the method 500 may be implemented in the context of the proceeding Figures and/or any subsequent Figure(s). Of course, however, the method 500 may be implemented in any desired environment. It should also be noted that the aforementioned definitions may apply during the present description.

As shown, a memory controller determines whether a memory read request is received. See decision 502. If a read request is received, the memory controller determines whether the read request is associated with a protected area of memory. See decision 504.

If the memory controller determines that the read request is not associated with a protected area of memory, unprotected memory is accessed for the data, and a response is sent to the client (e.g. including the accessed unprotected data, etc.). See operation 506 and 508. If the memory controller determines that the read request is associated with a protected area of memory, the memory controller determines whether the requesting client is a trusted client. See decision 510.

The memory controller may determine whether the requesting client is a trusted client in a variety of ways. For example, in one embodiment, the read request may include an indicator or signal indicating that the requested client is a trusted client. In another embodiment, the memory controller may include or have access to a lookup table including trusted clients. In another embodiment, the memory controller may include code for determining whether the client is a trusted client. In one embodiment, the read request may include a client identifier capable of being utilized to identify the requesting client.

If the memory controller determines that the client is not a trusted client, the read operation fails. See operation 512. In one embodiment, a read fail may return all zeros for the data. In another embodiment, a read fail may return all ones for the data. In another embodiment, a read fail may return irrelevant data. In another embodiment, a read fail may return a failure notice or error.

If the memory controller determines that the client is a trusted client, the memory controller accesses the protected memory portion and sends a response with a protect signal (e.g. along with the protected data, etc.) to the requesting client. See operation 514 and 516. In one embodiment, the client may utilize this protect signal to ensure the client protects the data by including the protect signal (or another protect signal, etc.) with data associated with the protected data to ensure the data is only written to a protected memory portion.

Figure 6:
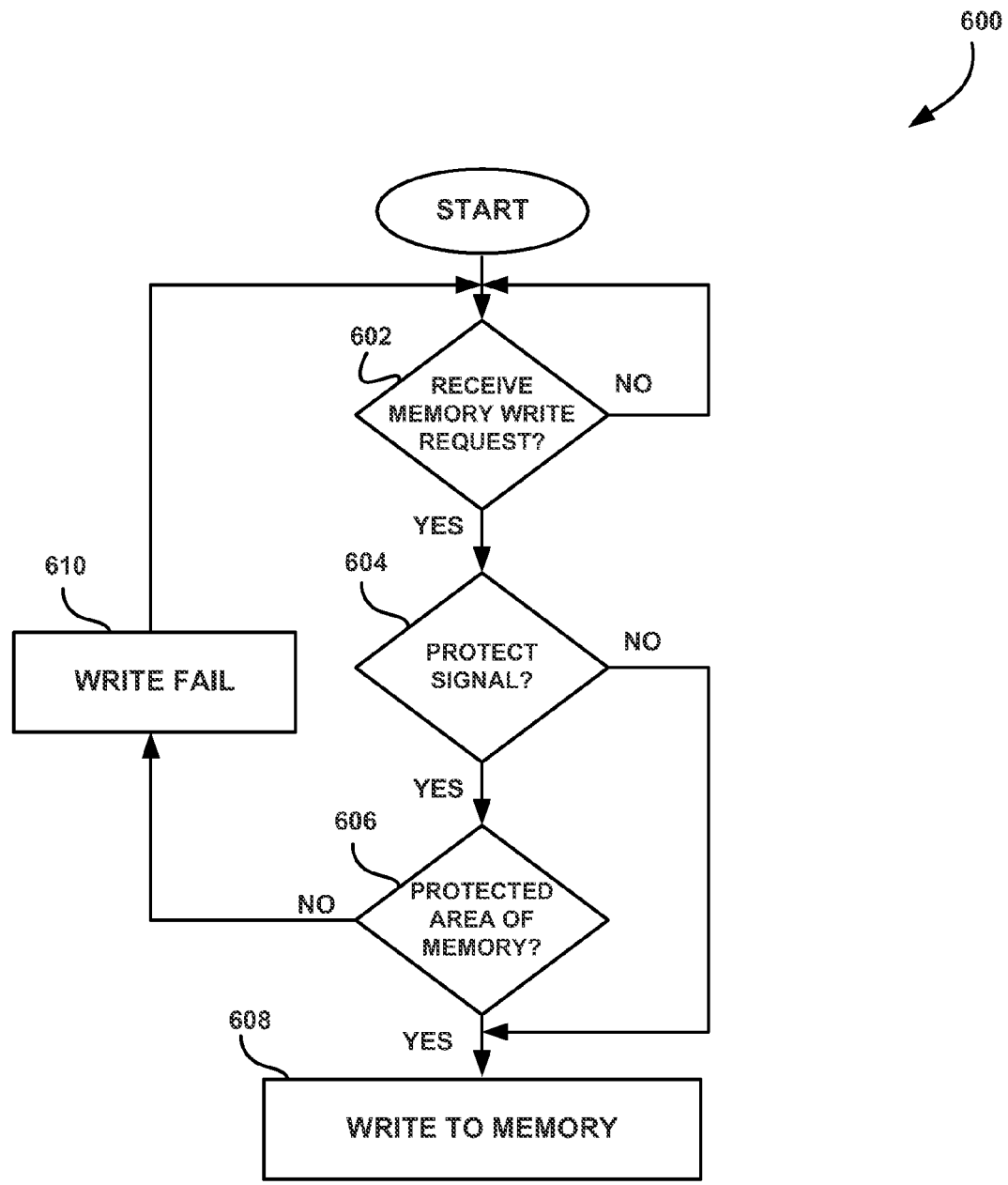
FIG. 6 shows a method for protecting data, in accordance with another embodiment.

FIG. 6 shows a method 600 for protecting data, in accordance with another embodiment. As an option, the method 600 may be implemented in the context of the proceeding Figures and/or any subsequent Figure(s). Of course, however, the method 600 may be implemented in any desired environment. It should also be noted that the aforementioned definitions may apply during the present description.

As shown, a memory controller determines whether a memory write request is received from a client. See decision 602. If a memory write request is received, the memory controller determines whether the write request (or the data) is accompanied by (or includes) a protect signal. See decision 604.

If the write request (or the data) is accompanied by (or includes) a protect signal, the memory controller determines whether the write request is pointing to an appropriate portion of protected memory. See decision 606. If the write request is pointing to an appropriate portion of protected memory, the data is written to the appropriate portion of protected memory. See operation 608.

If the write request is not pointing to an appropriate portion of protected memory, the write fails. See operation 610. If the write request (or the data) is not accompanied by (or does not include) a protect signal, the memory controller may write the data to the protected or unprotected portion of memory.

Figure 7:
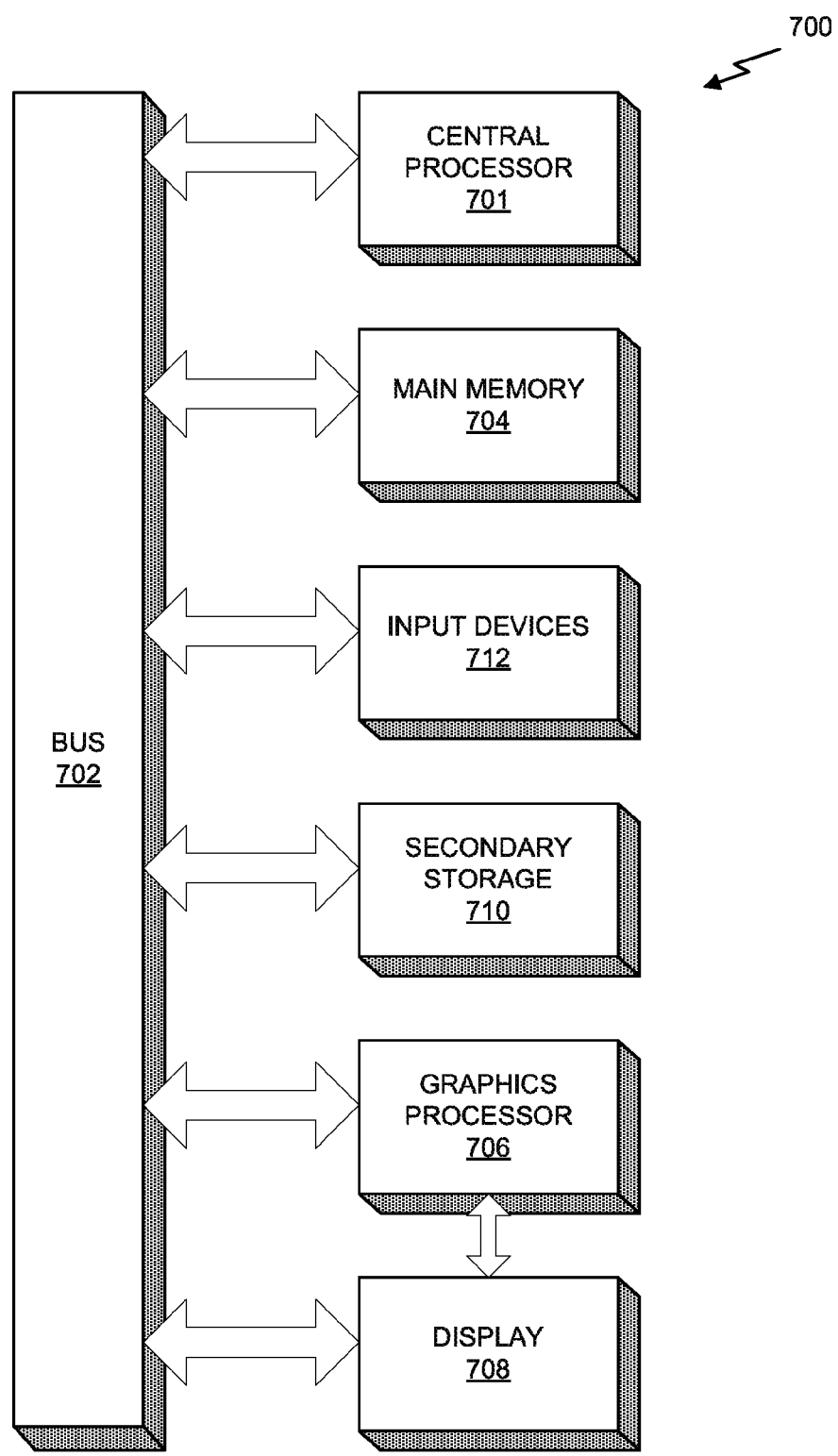
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory.

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 704 and/or the secondary storage 710. Such computer programs, when executed, enable the system 700 to perform various functions. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, a tablet computer, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a system from a client operating in an unprotected state, a request to read data from memory;
in response to the request, determining, by the system, that the data is stored in a protected portion of the memory;
in response to determining that the data is stored in the protected portion of the memory, returning, by the system to the client, the data and a protect signal for use in protecting the data, wherein the protect signal changes the unprotected state of the client to a protected state;
preventing, by the system, the client from writing to an unprotected portion of the memory, while the client is operating in the protected state.

2. The method of claim 1, wherein the protect signal is implemented in hardware.

3. The method of claim 1, wherein the request is received from the client with an associated status of the client.

4. The method of claim 3, wherein the data is conditionally returned to the client based on the associated status of the client.

5. The method of claim 3, wherein the associated status of the client includes at least one of trusted status, an untrusted status, or a conditionally trusted status.

6. The method of claim 3, wherein the data is returned to the client, if the client has one of a trusted status or a conditionally trusted status.

7. The method of claim 3, wherein the associated status of the client is changed programmatically.

8. The method of claim 3, wherein the client includes a graphics processor which includes a plurality of sub-clients each including an associated sub-status.

9. The method of claim 8, wherein a status of the graphics processor is conditionally trusted.

10. The method of claim 8, wherein a memory management unit determines whether the data requested to be read is stored in the protected portion of the memory.

11. The method of claim 10, wherein information describing the protected portion of the memory is communicated with a plurality of memory management sub-units via at least one secure link.

12. The method of claim 1, wherein the client is allowed to process the data with unprotected data stored outside the protected portion of the memory.

13. The method of claim 1, and further comprising storing an entire rendering context in the protected portion of the memory.

14. The method of claim 1, and further comprising:
receiving, by the system from the client, a request to write the data;
determining that the client is operating in the protected state; and
in response to determining that the client is operating in the protected state, only allowing the data to be written to the protected portion of the memory.

15. The method of claim 1, and further comprising dynamically adjusting a size of the protected portion of the memory.

16. The method of claim 1, wherein the protected portion of the memory includes a plurality of sub-portions, and further comprising:
identifying one of the portions of the sub-portions in which the data is stored;
wherein the data is returned with an identifier of the identified sub-portion.

17. The method of claim 1, wherein the protect signal changes the unprotected state of the client to the protected state by setting an flag internal to the client indicating that the client has read the data.

18. The method of claim 1, wherein in response to the client being cleared of the data, the client is changed from operating in the protected state to operating in the unprotected state.

19. The method of claim 1, wherein while the client is operating in the unprotected state, the client is allowed to write to the unprotected portion of the memory.

20. A sub-system, comprising:
a memory controller for:
receiving, from a client operating in an unprotected state, a request to read data from memory,
in response to the request, determining that the data is stored in a protected portion of the memory,
in response to determining that the data is stored in the protected portion of the memory, returning, by the system to the client, the data and a protect signal for use in protecting the data, wherein the protect signal changes the unprotected state of the client to a protected state;
preventing, by the system, the client from writing to an unprotected portion of the memory, while the client is operating in the protected state.

21. The sub-system of claim 20, wherein the sub-system is included in a system comprising memory coupled to the memory controller, and a plurality of clients from at least one of which the request is received.

* * * * *